United States Patent [19]

Pellerin, Jr.

[11] Patent Number: 5,421,201
[45] Date of Patent: Jun. 6, 1995

[54] ADAPTER FOR CONNECTING AN ENCODER REMOTE TRANSMITTER TO A GAS METER

[76] Inventor: William J. Pellerin, Jr., 29 Coopers Grove Rd., Kingston, N.H. 03848

[21] Appl. No.: 266,363
[22] Filed: Jun. 27, 1994
[51] Int. Cl.⁶ ............................................. G01F 15/00
[52] U.S. Cl. ............................................ 73/272 A
[58] Field of Search .................. 73/253, 258, 262, 269, 73/272 A, 272 R, 273, 274, 861.77, 861.78

[56] References Cited

U.S. PATENT DOCUMENTS

| | | | |
|---|---|---|---|
| 2,268,174 | 12/1941 | Spanko | 73/272 A |
| 2,684,810 | 7/1954 | Bryant | 73/272 A X |
| 3,283,998 | 11/1966 | Hood et al. | 73/272 A X |
| 3,555,902 | 1/1971 | Onoda et al. | 73/861.78 |
| 3,777,565 | 12/1973 | Munier et al. | 73/258 |
| 3,949,606 | 4/1976 | Blancett | 73/258 |
| 5,199,307 | 4/1993 | Onoda et al. | 73/861.78 |

Primary Examiner—Richard E. Chilcot, Jr.
Assistant Examiner—Elizabeth L. Dougherty
Attorney, Agent, or Firm—Frederick R. Cantor

[57] ABSTRACT

An adapter is provided between a gas meter and an encoder remote transmitter to provide a driving connection from the gas meter output shaft and the encoder drive shaft. The encoder remote transmitter is used to transmit gas meter readings to a remotely located receiver. The adapter permits a commercially available transmitter to be used with a wide range of commercially available gas meters.

1 Claim, 1 Drawing Sheet

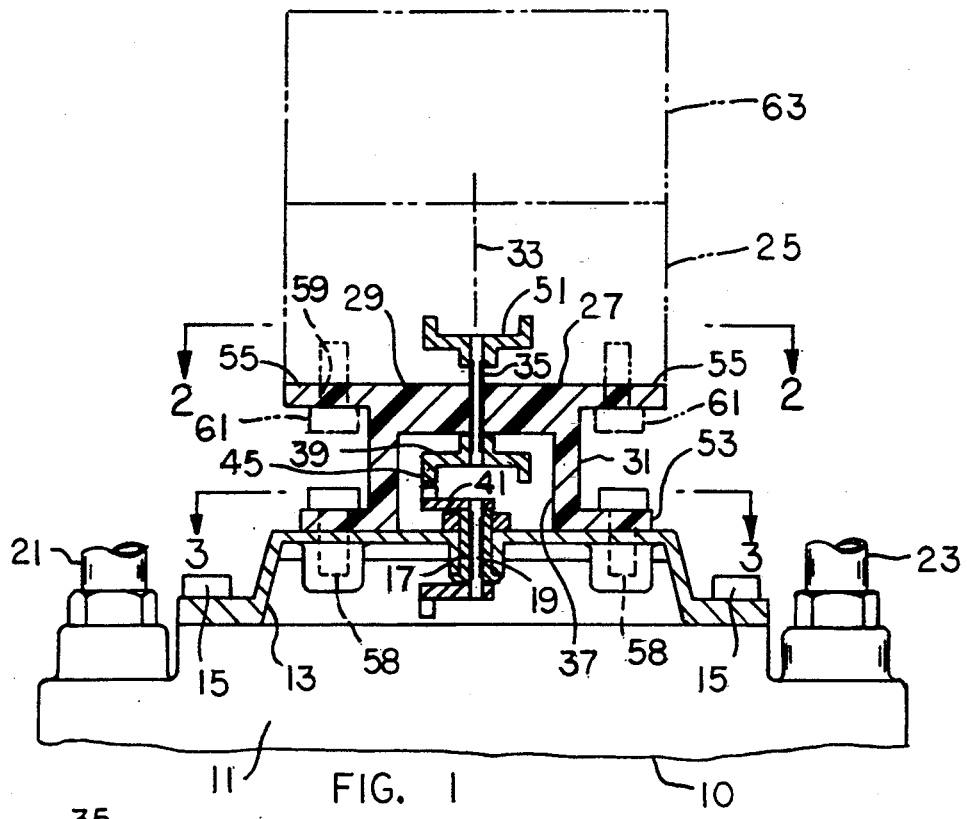
FIG. 1
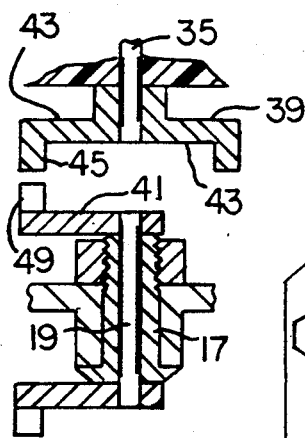
FIG. 4
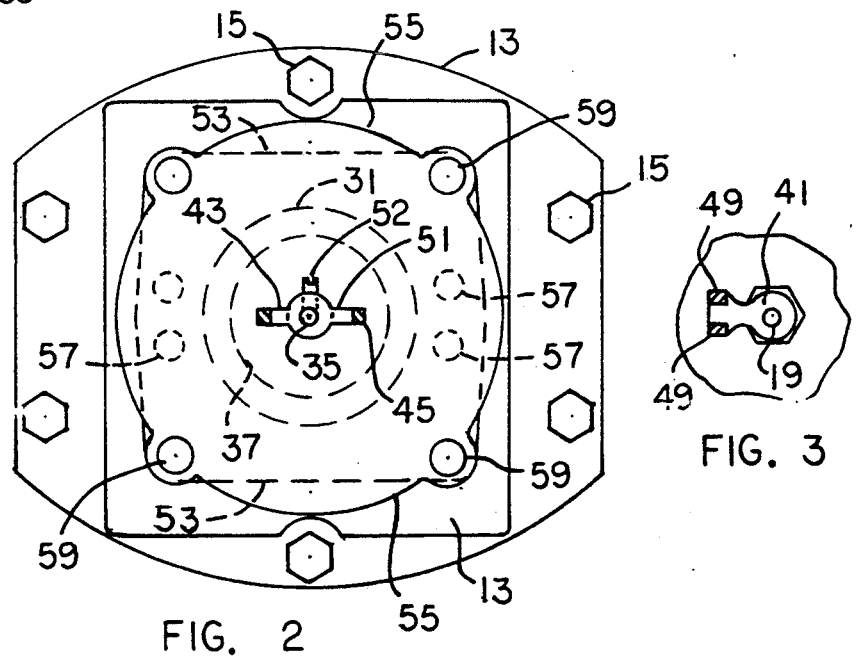
FIG. 2
FIG. 3

ADAPTER FOR CONNECTING AN ENCODER REMOTE TRANSMITTER TO A GAS METER

BACKGROUND OF THE PRESENT INVENTION

1. Field of the Invention

The present invention relates to gas meters.

The present invention, more particularly, relates to mechanical mechanisms for connecting gas meters to encoder remote transmitters (ERT).

2. Prior Developments

Historically, gas meters for fuel gas are equipped with readout dials, whereby an employee of the gas company is enabled to read the dial for billing purposes. Under conventional practice the gas company employee has to physically travel into the building to the area where the meter is installed in order to take a reading of the gas usage.

More recently encoder remote transmitters (ERT's) have been developed for electrically transmitting the meter reading to receivers located remote from the gas meter. When such a transmitter is installed on a gas meter the gas company employee can drive a van along the street and operate a receiver in the van to receive and record gas usage information broadcast by the transmitter. The process of obtaining the gas usage information is thereby accelerated, since the gas company employee does not have to leave the van and walk into the building in order to take a meter reading.

One known encoder remote transmitter for gas meters is manufactured by the Enscan Company. Unfortunately the encoder remote transmitter marketed by Enscan is designed for installation on only one specific fuel gas meter manufactured by the American Singer Gas Meter Company.

The present invention is directed to a relatively inexpensive adapter for enabling the Enscan transmitter to be used with any commercially available fuel gas meter. The adapter is designed to obviate the need for multiple encoder remote transmitter models mated to different specific gas meters.

SUMMARY OF THE PRESENT INVENTION

An object of the present invention is to provide an adapter for a gas meter.

Another object of the present invention is to, more particularly, provide a mechanical mechanism for connecting encoder remote transmitters to gas meters.

A further object of the present invention is, more particularly, to provide an adapter that comprises a housing having two sets of mounting holes. One set of mounting holes enables the adapter housing to be bolted to the upper end surface of a conventional gas meter. The other set of mounting holes enables a conventional encoder remote transmitter to be attached to the adapter housing. The adapter housing is thus located between the gas meter and the encoder remote transmitter.

The adapter comprises a vertical rotary shaft extending through the adapter housing. A clutch element is secured to the lower end of the rotary shaft, whereby the shaft is driven by an aligned output shaft in the gas meter. A second clutch element is secured to the upper end of the rotary shaft for driving an encoder shaft in the encoder remote transmitter. The rotary shaft in the adapter housing thus serves as a driving connection between the gas meter output shaft and the encoder shaft.

The two sets of mounting holes in the upper and lower ends of the adapter housing have different hole patterns, such that the adapter can serve as a connector between the commercially available encoder remote transmitter and a gas meter not otherwise specifically usable with the transmitter. Various different hole patterns can be used in the lower end of the adapter to enable a given encoder remote transmitter to be used with a range of different gas meters.

The invention enables a commercially available encoder remote transmitter to be used with various different preexisting gas meters, such that the encoder remote transmitter technology can be utilized in existing gas meter installations without the need for redesigning the gas meter or the encoder remote transmitter.

In summary, and in accordance with the above discussion, the foregoing objectives are achieved in the following embodiments.

1. An adapter for operatively connecting the output shaft of a gas meter to the input shaft of an encoder remote transmitter;

said adapter comprising a housing having an upper end, a lower end, and a central vertical axis;

said housing having a bottom flange seatable on the top plate of a gas meter, and a top flange seatable against the bottom surface of an encoder remote transmitter casing;

a first series of holes in said bottom flange for attaching the adapter to a gas meter;

a second series of holes in said top flange for attaching the adapter to an encoder remote transmitter casing;

a rotary shaft extending through said housing on said central axis;

a central cavity in the lower end of said housing;

a first clutch element secured to said rotary shaft within said central cavity for operatively connecting said rotary shaft to the output shaft of a gas meter; and a second clutch element secured to said rotary shaft above the upper end of said housing for operatively connecting said rotary shaft to the input shaft of an encoder remote transmitter.

2. The adapter, as described in paragraph 1, wherein said first and second clutch elements are spaced apart a sufficient distance as to permit said rotary shaft to be adjusted a limited distance along the shaft axis, whereby the second clutch element can be lifted to facilitate engagement of the first clutch element with the shaft of a gas meter located below the adapter.

3. The adapter, as described in paragraph 1, wherein said first series of holes has a different hole pattern than said second series of holes.

4. The adapter, as described in paragraph 3, wherein said top and bottom flanges are spaced apart a sufficient distance to permit connector bolts to be moved into the space between the flanges for insertion into each series of holes.

5. The adapter, as described in paragraph 1, wherein said housing has a cylindrical exterior side surface; and said top and bottom flanges extending radially outwardly beyond said cylindrical side surface to form an annular bolt insertion space.

6. An adapter for operatively connecting the output shaft of a gas meter to the input shaft of an encoder remote transmitter;

said adapter comprising a housing having an upper end, a lower end, and a central vertical axis;

a first means for attaching the adapter to an upper surface of a gas meter, a second means for attaching the adapter to a lower surface of an encoder remote transmitter, so that the adapter is interposed between said gas meter and said transmitter;

a rotary shaft extending through said housing on said central axis;

said shaft having an upper end, and a lower end;

a first clutch element secured to the lower end of said rotary shaft for operatively connecting said rotary shaft to said output shaft of a gas meter; and a second clutch element secured to the upper end of said rotary shaft for operatively connecting said rotary shaft to the input shaft of an encoder remote transmitter.

7. The adapter, as described in paragraph 6, wherein said first and second clutch elements are spaced apart a sufficient distance so as to permit the rotary shaft to be adjusted a limited distance along the shaft axis.

8. The adapter, as described in paragraph 6, wherein said first attaching means comprises a first series of holes in the upper end of said housing; and second attaching means comprises a second series of holes in the lower end of said housing.

9. The adapter, as described in paragraph 8, wherein said first series of holes has a different pattern than said second series of holes.

10. The adapter, as described in paragraph 6, and further comprising a central cavity in the lower end of said housing; and said first clutch element being located in said central cavity.

A BRIEF DESCRIPTION OF THE DRAWINGS

FIG. 1, is a sectional view, taken through an adapter constructed according to the present invention. A fragmentary portion of an associated gas meter is shown in FIG. 1, in order to illustrate the cooperative relationship between the gas meter, the encoder remote transmitter, and the adapter.

FIG. 2, is a transverse sectional view, taken on line 2—2 in FIG. 1.

FIG. 3, is a fragmentary transverse sectional view, taken on line 3—3 in FIG. 1.

FIG. 4, is an enlarged fragmentary cross-sectional view, of structural details used in the FIG. 1 assembly.

DESCRIPTION OF THE PREFERRED EMBODIMENTS OF THE PRESENT INVENTION

FIG. 1, is a sectional view, taken through an adapter constructed according to the present invention. A fragmentary portion of an associated gas meter is shown in FIG. 1, in order to illustrate the cooperative relationship between the gas meter, the encoder remote transmitter, and the adapter.

FIG. 2, is a transverse sectional view, taken on line 2—2 in FIG. 1.

FIGS. 1 and 2 show a conventional gas meter 10, with the read out dial mechanism removed and relocated. The meter housing 11 has a top cover plate 13 secured thereon by a plurality of bolts 15. The cover plate 13 mounts a bearing 17 for the gas meter output shaft 19.

The gas meter 10 can be of any conventional design. Pressurized fuel gas at a regulated pressure can be admitted to the gas meter through an inlet pipe 21. The gas then flows through a series of valves and diaphragms before exiting through an outlet pipe 23. Gearing associated with the diaphragms rotates in accordance with the gas flow rate, so as to turn the output shaft 19 at a speed proportional to the gas volumetric flow rate.

In FIG. 1, there is shown in block diagrammatic form an encoder remote transmitter (ERT) 25. Typically the encoder remote transmitter 25 comprises a vertical shaft having a permanent magnet thereon that interacts with the magnetic field of a stationary coil, whereby a pulse is generated for each revolution of the shaft. A pulse counting circuit counts the pulses to generate a charge representative of the accumulated shaft revolutions (and the volumetric gas flow sensed by meter 10). The electrical output of the circuit can be applied to a radio transmitter for transmission of the gas usage information to a remote receiver, e.g., a receiver located in a vehicle on the road in the vicinity of the building where the meter is located. The transmitter is preferably a commercial unit marketed by Enscan Company.

The present invention is more particularly concerned with an adapter 27 located between gas meter 10 and the encoder remote transmitter 25. The adapter 27 comprises a housing 29 having a lower end seated against meter top plate 13, and an upper end abutting the bottom surface of the encoder remote transmitter 25.

FIG. 4, is an enlarged fragmentary cross-sectional view, of structural details used in the FIG. 1 assembly.

Housing 29 has a cylindrical outer surface 31 concentric with a central vertical axis 33. Rotary shaft 35 is mounted in housing 29 for rotation around axis 33. The lower end of shaft 35 is located in a cylindrical cavity 37 in housing 29. A clutch element 39 is secured to shaft 35 for engagement with a mating clutch element 41 carried by the meter output shaft 19.

Clutch elements 39 and 41 can have various configurations. As shown in the drawings, clutch element 39 comprises an arm 43 extending laterally from a hub secured to shaft 35. A set screw (not shown) can be used to attach the hub to the shaft. Two prongs (or pins) 45 extend downwardly from opposite ends of arm 43.

FIG. 3, is a fragmentary transverse sectional view, taken on line 3—3 in FIG. 1.

Clutch element 41 comprises an arm 47 extending laterally from shaft 19, and two fingers 49 extending upwardly from arm 47. Fingers 49 are spaced apart by a distance slightly greater than the width dimension of the pin 45 on arm 47. FIG. 1, shows shaft 35 in a raised position wherein the leftmost prong (pin) 45 is located above fingers 49. When shaft 35 is lowered (gravitationally) the prong 45 will drop into the space between fingers 49 to establish a driving connection between the meter output shaft 19 and the adapter shaft 35.

A clutch element 51 is secured to the upper end of shaft 35 by a set screw 52. Clutch element 51 is identical to the aforementioned clutch element 39 on the lower end of shaft 35.

When the adapter 27 is bolted to the gas meter top plate 13 and the lower end of encoder remote transmitter 25, the rotary shaft 35 and clutch elements 39 and 51 establish a driving connection between the meter output shaft 19 and the drive shaft of the encoder remote transmitter.

Adapter housing 29 comprises a lower flange 53 and an upper flange 55. Flange 53 has four bolt holes 57 that mate with threaded holes in the meter housing top plate 13. Four bolts 58 are extended through the holes in flange 53 into the threaded holes in cover plate 13, to thus connect the adapter 27 to the gas meter. After the four bolts 58 have been tightened down, the adapter shaft 35 can be lifted and turned to position one of the prongs 45 within the fingers 49, thereby establishing a driving connection from meter output shaft 19 to the adapter shaft 35.

The upper flange 55 on the adapter housing is equipped with four bolt holes 59 that are spaced apart the same distance as four threaded holes in the bottom face of the encoder remote transmitter 25. Four bolts 61 are extended through the bolt holes 59 into the threaded holes in transmitter 25, to thereby affix the transmitter 25 to adapter 27.

Flanges 53 and 55 are spaced apart a distance greater than the total length of each connector bolt 59 or 61, such that each bolt can be inserted into the space between the flanges, and then moved axially through the bolt holes 57 or 59.

The pattern of holes 57 is related to the placement of the threaded holes in meter top plate 13, whereas the pattern of holes 59 is related to the placement of the threaded holes in the lower face of encoder remote transmitter 25. The hole patterns are designed to enable the adapter 27 to be operatively connected to transmitter 25 and gas meter 10. By varying (or selecting) the hole patterns it is possible to mate a given transmitter 25 with a range of different gas meters.

The upper clutch element 51 is designed to mate with a clutch element on the lower end of the drive shaft of the encoder remote transmitter 25, whereby the transmitter 25 is enabled to accumulate and broadcast the gas usage information.

As an optional feature, a visual readout dial mechanism 63 can be bolted to the upper end of transmitter 25, to provide a visible readout of the shaft revolution count. The encoder drive shaft acts as the means for powering the dial mechanism 63.

The invention is concerned particularly with the construction of adapter 27, whereby the technology of the encoder remote transmitter 25 can be utilized with a wide range of different gas meters, without redesigning the gas meter or the transmitter.

The present invention describes an Adapter for Connecting an Encoder Remote Transmitter to a Gas Meter. Features of the present invention are recited in the appended claims. The drawings contained herein necessarily depict specific structural features and embodiments of the Adapter for Connecting an Encoder Remote Transmitter to a Gas Meter, useful in the practice of the present invention.

However, it will be appreciated by those skilled in the arts pertaining thereto, that the present invention can be practiced in various alternate forms and configurations. Further, the previously detailed descriptions of the preferred embodiments of the present invention, are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What is claimed is:

1. An adapter for operatively connecting the output shaft of a gas meter to the input shaft of an encoder remote transmitter:

said adapter comprising a unitary rigid housing (29) having an upper end, a lower end, and a central vertical axis;

said housing having a bottom flange (53) seatable on the top plate of a gas meter, a top flange (55) seatable against the bottom surface of an encoder remote transmitter casing, and an annular side wall permanently and rigidly joining said top and bottom flanges in non-adjustable fashion;

said annular side wall having an outer side surface (31) located closer to said central axis than said flanges, whereby said flanges extend radially outwardly beyond said side surface to form an external bolt insertion space;

a first series of bolt holes in said bottom flange for attaching the adapter to a gas meter;

a second series of bolt holes in said top flange for attaching the adapter to an encoder remote transmitter casing;

said top and bottom flanges being spaced apart a distance slightly greater than the length of the associated connector bolts, whereby the connector bolts can be moved into the space between the flanges for insertion into each series of bolt holes;

said first series of bolt holes having a different hole pattern than said second series of holes, whereby the adapter serves as a connecting device for encoder transmitters and gas meters that could not otherwise be operatively and directly coupled together;

a rotary shaft extending through said housing on said central axis;

said shaft being slidably mounted in said housing so as to be capable of vertical adjustment along said axis;

said housing containing a central cavity (37) communicating with the housing lower end;

a first clutch element (39) secured to said rotary shaft within said central cavity for operatively connecting said rotary shaft to the output shaft of a gas meter;

a second clutch element (51) secured to said rotary shaft above the upper end of said housing for operatively connecting said rotary shaft to the input shaft of an encoder remote transmitter; and said first and second clutch elements being spaced apart a sufficient distance as to permit said rotary shaft to be adjusted a limited distance along said central axis, whereby the second clutch element can be lifted to facilitate engagement of the first clutch element with the shaft of a gas meter located below the adapter.

* * * * *